UNITED STATES PATENT OFFICE.

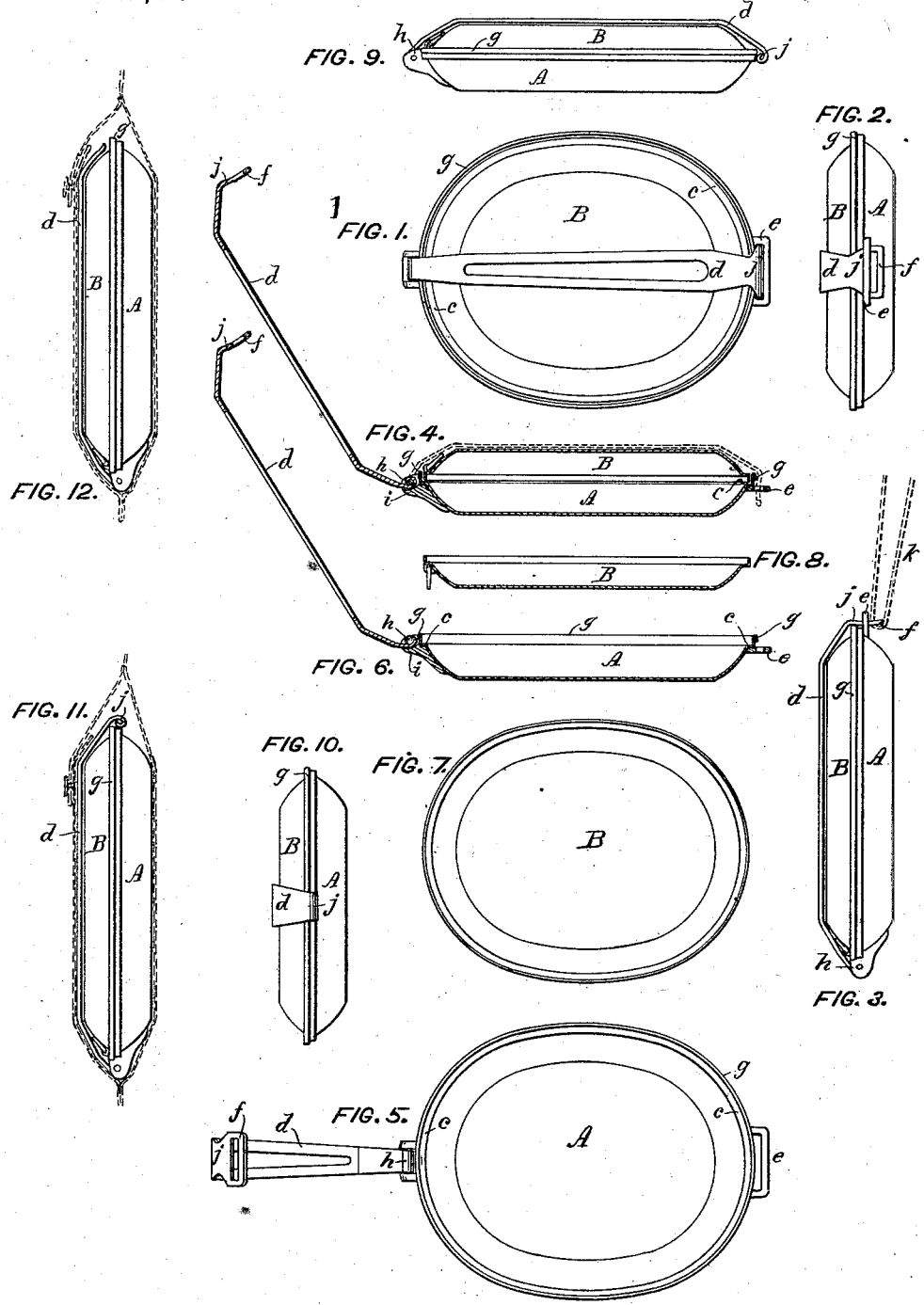

ALEXANDER CHAMBERS, JR., AND ALEXANDER McD. McCOOK, OF UNITED STATES ARMY.

IMPROVEMENT IN CONVERTIBLE MEAT CASES OR CANS.

Specification forming part of Letters Patent No. 163,359, dated May 18, 1875; application filed April 23, 1875.

*To all whom it may concern:*

Be it known that we, ALEXANDER CHAMBERS, Jr., a major in the United States Army, and having a residence at Owatonna, in the county of Steele, in the State of Minnesota, and ALEXANDER McD. McCOOK, a lieutenant-colonel in the United States Army, and having a residence at Dayton, in the county of Montgomery, in the State of Ohio, have jointly invented certain new and useful Improvements in Convertible Cans or Cases for the use of soldiers, sportsmen, travelers, and other persons in carrying, cooking, and serving rations of meat and other food, and of which invention the following is a specification, reference being had to the accompanyng drawing.

The general object of this invention is to produce a very simple, cheap, and durable close-covered can or case, in which soldiers, sportsmen, travelers, and others can neatly, safely, and conveniently carry rations of meat and other food, and which can be readily separated into two parts, of which one shall constitute a convenient and good frying-pan, and the other an eating-plate.

One part of this invention consists of a portable convertible meat can or case, composed of a frying-pan, having a seat on and around its rim, and a raised flange around and outside of the seat, a detachable food-plate inverted over the pan and arranged in the form of a raised cover upon the seat within the raised flange of the rim of the pan, and a handle hinged at one end to the pan, and conformed to and turned down upon and across the said raised cover, so as to retain the latter in place on the pan when the space between the pan and raised cover shall be filled with meat or similar rations, and the whole placed in a suitable pocket of a haversack, game-bag, or overcoat for convenient carrying, and so that upon removing the whole from the pocket the handle can then be turned upward and outward against a stop, so as to release the said cover and serve as an ordinary handle on the frying-pan, and so that when the cover shall be removed from the pan the cover will then be a convenient food-plate from which to eat.

Another part of our invention consists in the combination, with a frying-pan and a removable dish-like cover on the pan, of a handle hinged at one end to the pan, and conformed to and turned down upon and across the cover on the pan, and having its other end shaped to fit against and spring over the outer edge of the rim of the pan, and thereby engage with the latter, so that the handle shall more securely retain the cover on the pan, and yet so that the handle can be sprung off from the rim of the pan by hand, and then turned up, so as to permit the cover to be removed, and so as to form a practically rigid upwardly and outwardly projecting handle on the pan.

Another part of our invention consists in the combination, with a close-covered vessel composed of a frying-pan having a removable dish-plate cover thereon, and a handle hinged at one end to the pan, and turned down across and upon the cover on the pan, of a laterally-projecting loop on the pan, and a loop upon the other end of the handle extending through and beyond the loop on the pan, so that the whole can be slung upon and conveniently carried by a hook, cord, or strap inserted through the said loop of the handle outside of the loop on the pan, and so as to temporarily prevent the withdrawal of the handle from the loop on the pan, and consequently retain the cover in place upon the pan.

In the aforesaid drawing, Figure 1 is a top view, Fig. 2 an end view, and Fig. 3 a side view, of a close-covered convertible can or case which embodies all the aforesaid parts of this invention. Fig. 4 is a central longitudinal section of the same, with the hinged handle turned upward and outward. Fig. 5 is a top view, and Fig. 6 is a central longitudinal section, of the frying-pan portion of the vessel shown in Figs. 1, 2, and 3; and Fig. 7 is a top view, and Fig. 8 a section, of the cover of the same vessel. Fig. 9 is a side edge view, and Fig. 10 is an end view, of a convertible meat can or case which embodies the first and second aforesaid parts only of this invention; and Fig. 11 is a side edge view of the same as inserted in a carrying-pocket, indicated by dotted lines. Fig. 12 is a like view of a convertible case or vessel which embodies only the first aforesaid part of this invention.

Like parts are marked by like letters in the different figures.

A is a frying-pan, and B is a removable dish-like cover on the pan, each made from sheet-tin, sheet-copper, or other suitable material. The pan A has around its rim a seat, $c$, and a raised flange, $g$, around the seat, and the cover B fits within the flange $g$ and upon the seat $c$ of the pan, substantially as shown in Fig. 4, so that the pan A and raised cover B together constitute a close-covered vessel suitable for containing rations of meat and similar food. A handle, $d$, is so hinged at one end, $h$, to the pan A, as shown in Figs. 4, 5, and 6, and is so shaped, that it can be turned down across and against the cover B, as shown in Figs. 1, 2, 3, 9, 10, 11, and 12. When the handle $d$ is thus turned down upon the cover B on the pan A the handle will then keep the cover close against the pan, so that a soldier, sportsman, or traveler can safely, neatly, and conveniently carry rations of meat and similar food by putting it in the space inclosed between the pan A and cover B, Fig. 4, and then turning the handle $d$ down across the cover, and inserting the whole in a pocket of his haversack, game-bag, or overcoat, as indicated in Figs. 11 and 12; and, upon taking the same out of the pocket, the handle $d$ can be turned up off from the cover B, so that the latter can be removed from the pan A, and so that the part $d$, by meeting a stop, $i$, on the pan, will form a practically rigid handle, as shown in Figs. 4, 5, and 6, by which the pan can be conveniently held over a fire in cooking meat or other food in the pan, and the cover B, when off from the pan, is a good and convenient food-plate, as shown in Figs. 7 and 8.

In order to more securely retain the cover B on the pan A, by means of the hinged handle $d$ extending across the cover, we extend and shape the end part $j$ of the handle so that it springs over the rim of the pan, substantially as shown in Figs. 3, 9, and 11, and yet so that it can be sprung back off from the rim, to release the cover and turn back the handle.

In order that the convertible can or case may be conveniently carried by a hook, cord, or strap, and at the same time be prevented from opening, we form and arrange a perforated lug or loop, $e$, Figs. 1, 4, 5, and 6, on the pan A, and also form and arrange a loop, $f$, Figs. 2, 4, 5, 6, on the handle $d$, so that when the handle is turned down across the cover B on the pan, as shown in Figs. 1, 2, and 3, the loop $f$ of the handle then extends through and beyond the loop $e$, as in Fig. 2, and so that the vessel can be carried by a hook, cord, or strap inserted through the loop $f$ outside of the loop $e$, substantially as indicated by dotted lines at $k$ in Fig. 3, and at the same time the hook, cord, or strap will prevent the withdrawal of the loop $f$ from the loop $e$, and will consequently make the handle $d$ keep the cover B closed tight on the pan.

We are aware that frying-pans have been heretofore devised with handles hinged at one end to one side of the pan, and so as to be used as an ordinary handle, and also turned down across the pan, and temporarily secured at the other end to the other side of the pan; and that in other cases one pan has been covered by another, inverted and resting on a seat within the rim of the former, and secured thereto by loops and catches thereon, or by a cord inserted through perforated lugs and loops on the pans.

What we claim as our joint invention is—

1. A portable convertible meat can or vessel, consisting of a frying-pan, A, and a detachable food-plate or dish, B, arranged as a raised cover upon a flanged seat, $c$, on and around the rim of the pan, and a handle, $d$, hinged at one end to the pan, and conformed to and turned down upon the said raised cover, substantially as shown and described.

2. In combination with the frying-pan A and the removable dish or food-plate B, forming a raised cover on the pan, as described, a handle hinged at one end to the pan, and conformed to and extended across the said raised cover, and having its other end bent or shaped to and sprung over the rim of the pan, and thereby engaged with the latter, substantially as shown and described.

3. In combination with the frying-pan having the loop $e$ thereon, and the detachable dish or food-plate constituting the raised cover on the pan, the handle hinged at one end to the pan, and conformed to and extended across the said raised cover, and having at its other end a carrying-loop, $f$, extended through the said loop on the frying-pan, substantially as shown and described.

In testimony whereof we hereunto subscribe our names this 2d day of December, 1874.

ALEXANDER CHAMBERS, JR.
ALEXANDER McD. McCOOK.

Witnesses:
WILLIAM H. SHIRLAND,
AUSTIN F. PARK.